(12) United States Patent
Shaw

(10) Patent No.: US 12,029,211 B2
(45) Date of Patent: Jul. 9, 2024

(54) SLIDE LOCK ASSEMBLY AND SNARING TOOL

(71) Applicant: Kevin Bernard Shaw, Corpus Christi, TX (US)

(72) Inventor: Kevin Bernard Shaw, Corpus Christi, TX (US)

( * ) Notice: Subject to any disclaimer, the term of this patent is extended or adjusted under 35 U.S.C. 154(b) by 172 days.

(21) Appl. No.: 17/404,227

(22) PCT Filed: Dec. 21, 2020

(86) PCT No.: PCT/US2020/066320
§ 371 (c)(1),
(2) Date: Aug. 17, 2021

(87) PCT Pub. No.: WO2021/127618
PCT Pub. Date: Jun. 24, 2021

(65) Prior Publication Data
US 2022/0264867 A1 Aug. 25, 2022

Related U.S. Application Data

(60) Provisional application No. 62/950,719, filed on Dec. 19, 2019.

(51) Int. Cl.
*A01M 23/34* (2006.01)
*B25J 1/04* (2006.01)
*E05B 63/12* (2006.01)
*E05B 75/00* (2006.01)
*F16L 3/127* (2006.01)

(52) U.S. Cl.
CPC ............... *A01M 23/34* (2013.01); *B25J 1/04* (2013.01); *E05B 63/122* (2013.01); *E05B 75/00* (2013.01); *F16L 3/127* (2013.01)

(58) Field of Classification Search
CPC ...... A01M 23/34; A01M 15/00; A01M 15/04; E05B 67/08; E05B 67/10; E05B 67/28; E05B 67/36; E05B 71/00; E05B 73/00; E05B 73/005; E05B 73/007; E05B 73/02; E05B 75/00; F16M 2200/028; B66B 1/18; B66B 1/62; B62B 2203/44; B66C 1/625; B66F 9/187
USPC .......... 43/59, 85, 86, 87; 248/407, 408, 409; 119/712, 801, 802, 803, 804, 805; 294/119.2, 31.2
See application file for complete search history.

(56) References Cited

U.S. PATENT DOCUMENTS

| | | | |
|---|---|---|---|
| 1,382,520 A * | 6/1921 | Lundene | A01K 15/003 119/804 |
| 1,763,181 A * | 6/1930 | Reeves | A01K 15/003 119/804 |

(Continued)

*Primary Examiner* — Darren W Ark
*Assistant Examiner* — Zoe Tam Tran
(74) *Attorney, Agent, or Firm* — M. Susan Spiering; Ochoa & Associates, P.C.

(57) ABSTRACT

Disclosed herein is a non-spring based lock mechanism, described as a lock and lever, telescoping slide assembly comprising an elongated, stationary, multi-faceted tube. Also disclosed is a snaring tool employing the non spring based lock mechanism for gripping items such as industrial pipe and other large moving items which can be ensnared. An optional locking pin mechanism can be added to the lock and lever slide assembly to avoid accidental release of the gripping means.

22 Claims, 12 Drawing Sheets

(56) References Cited

U.S. PATENT DOCUMENTS

| | | | | |
|---|---|---|---|---|
| 2,687,866 A * | 8/1954 | Johnson | ............... | F16B 7/14 |
| | | | | 248/188.4 |
| 2,704,052 A * | 3/1955 | Wood | ............... | A01K 15/003 |
| | | | | 43/87 |
| 3,319,609 A * | 5/1967 | Pickard | ............... | A01K 15/003 |
| | | | | 119/804 |
| 3,540,769 A * | 11/1970 | Rosser | ............... | A01M 23/34 |
| | | | | 294/119.2 |
| 3,949,514 A * | 4/1976 | Ramsey | ............... | A01K 15/003 |
| | | | | 43/87 |
| 4,012,158 A * | 3/1977 | Harper | ............... | A47C 7/402 |
| | | | | 248/408 |
| 7,980,519 B2 * | 7/2011 | Chen | ............... | A47B 9/14 |
| | | | | 248/161 |
| 8,485,488 B2 * | 7/2013 | Forrest | ............... | A47C 3/20 |
| | | | | 248/407 |
| 8,544,421 B2 * | 10/2013 | Katers | ............... | A01K 15/003 |
| | | | | 119/803 |
| 8,607,742 B2 * | 12/2013 | Lash | ............... | F41H 13/0018 |
| | | | | 119/796 |
| 8,840,630 B2 * | 9/2014 | Lavelle | ............... | A61B 17/00234 |
| | | | | 81/489 |

\* cited by examiner

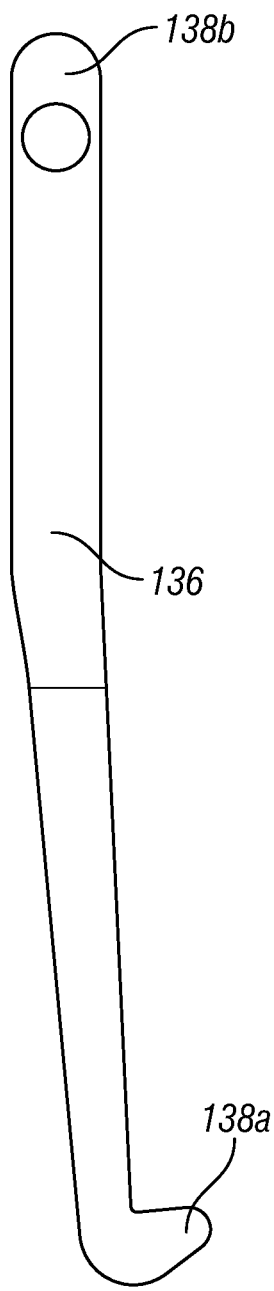
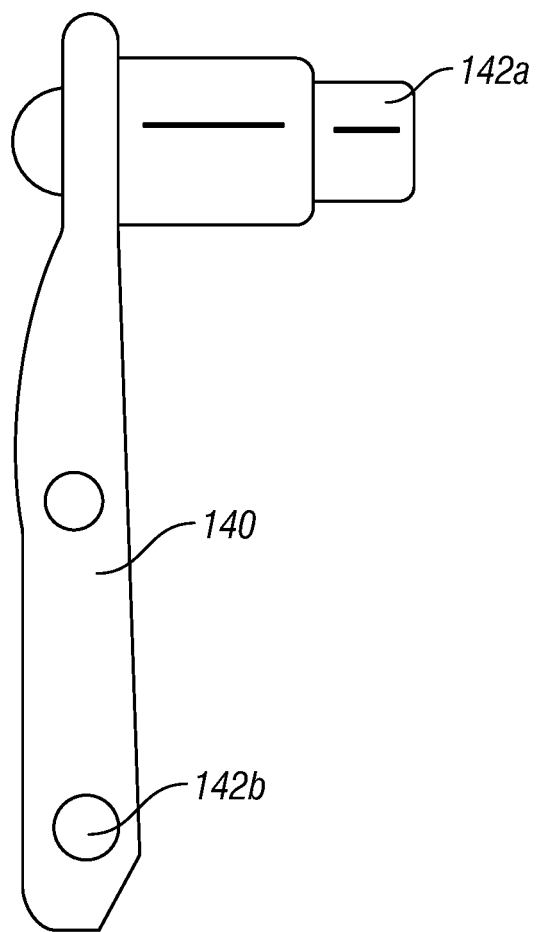
FIG. 3A  FIG. 3B

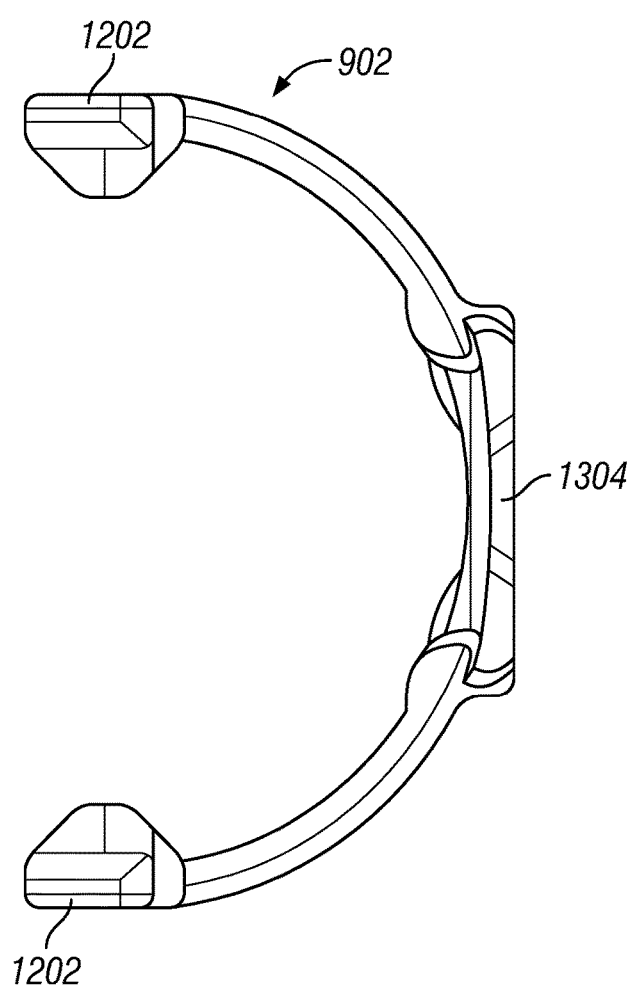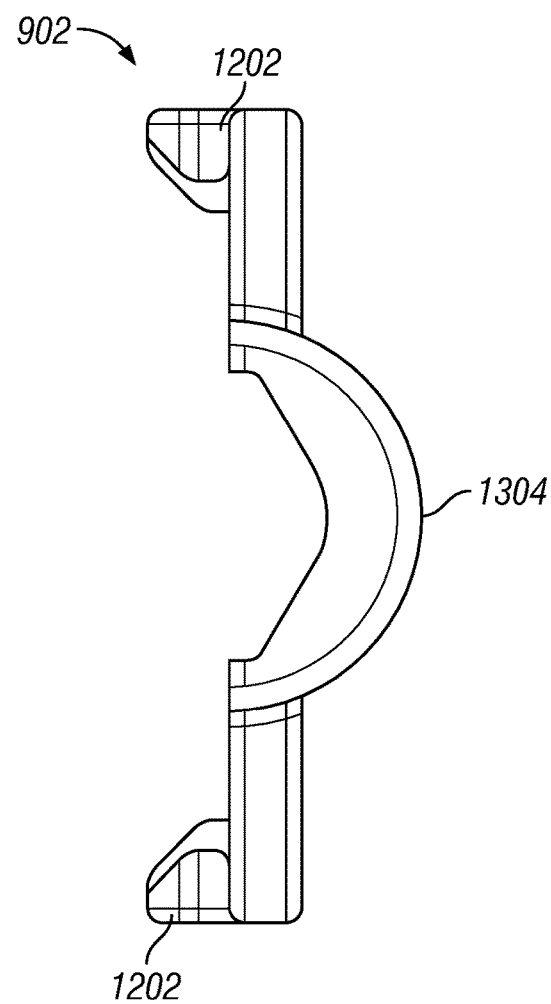
FIG. 15
FIG. 16

SLIDE LOCK ASSEMBLY AND SNARING TOOL

CLAIM FOR PRIORITY

This application is based on international application PCT/US2020/066320 filed on Dec. 21, 2020, which was based on U.S. Provisional Patent Application Ser. No. 62/950,719 filed on Dec. 19, 2019, each entitled "Slide Lock Assembly And Snaring Tool", the disclosures thereof incorporated by reference in their entirety, and the priorities hereby claimed.

FIELD OF THE INVENTION

The present invention relates generally to slide lock assemblies having at least one releasable locking position as well as to snaring tools. More specifically, the present disclosure relates to a slide locking assembly for locking in various positions along the length of a slide member and to a portable snaring tool for gripping industrial pipes and other elements.

BACKGROUND

The present disclosure relates to slide lock assemblies having telescopic slide members and a releasable latch system that provides for locking an object in a desired position. In some instances, such slide lock assemblies are used in a snaring tool. However, such slide assemblies can be used in alternative environments, as desired by the user.

A variety of snaring tools are designed to restrain, retrieve or capture objects or animals are known in the art. Most of the snaring tools comprise a tubular sleeve in which integrated mechanisms are controlled manually to tighten a flexible cable that forms a loop.

U.S. Pat. No. 2,704,052, by Fred A Wood, discloses a device for capturing and restraining animals. The device comprises a tubular handle member having a flexible cable secured at its lower end with free portion of the cable passing through the tubular member in such a manner as to form an adjustable loop, to permit the user to capture and control an animal. The free end passed through the tube and has a positive locking mechanism comprising of a compression and retainer spring, continuously engaging the flexible member associated with and completely housed within an upper end of the device.

U.S. Pat. No. 3,540,769 A, by Gerald E Rosser, discloses an animal snare, and release and lock assemblies therefor, which is automatically powered, such as by a spring, and is released by the operator through a control trigger on a handle. The snare employs a closed loop that is expanded when the device is cocked and which is tightly and quickly closed about the body of the fish or other animal by a biasing force when the control trigger is actuated.

U.S. Pat. No. 8,544,421 B2, by Andrew Katers, discloses an animal control pole method of using one or more systems. The control pole includes a pole with a first end adapted to be held by a user, and a second end adapted to ensnare and assist in the control of an animal. The pole has an axial bore extending therethrough and a cable that extends through the axial bore. The cable is longer in length than the pole, and extends from each end of the pole. A retaining element is located at the second end of the pole and retains the free end of the cable that extends from the second end, so as to form a closed animal engageable loop. A latching mechanism is adjacent to the first end that allows control over the size of the loop. The animal control pole includes dual release mechanisms for adjusting the length of the loop or quickly releasing the loop itself by sliding a grip.

In various patents, mechanisms deployed for moving an object, or for tightening a loop, require a large number of parts usually combined with one or more return springs. This results in significant costs and risks of malfunction. Moreover, the existing mechanisms do not always allow users to perfectly apply the clamping effect that a user desires to get ahold of the object at a pre-determined position. In addition, often, the existing mechanisms do not prevent accidental release of the object.

In light of the foregoing, there continues to exist a need for slide lock assemblies, in particular those having non-spring loaded mechanisms. These locks can be used for a variety of applications, among them, for applications involving moving and releasing of an object. Further, there exists a need for a tool that is simple, safe to operate, easy to use, and efficient in operation, that can release a cable and adjust size of the loop of the cable using non-spring-based mechanisms.

SUMMARY OF THE INVENTION

A slide lock assembly having a locking system for locking an object and slidingly engaging the object is disclosed in the present invention. The slide assembly comprises a stationary, multi-faceted (also called multi-channel) elongated tubular element which together with at least one slide element acts to allow extension and retraction, and is housed within an outer tube support. The multi-faceted tube includes a plurality of channel-shaped slots adapted to receive a mounting post. The slide assembly is also disclosed as having a first and second slide member, an elongated member, a support tube, a release means, and an adjusting means. The elongated member, the support tube, the release means, and the adjusting means form a central lock system. The release means allows the release of an object from the slide lock assembly. On actuating the adjusting means, the second slide member is allowed to slide along (retract or extend) the length of the first slide member, thereby releasably locking the second slide member along the length of the first slide member.

In an embodiment, the elongated member is positioned inside the first slide member. The elongated tubular member consists of a plurality of channels. A support tube is mounted on the elongated member and positioned inside the first slide member. A second slide member is telescopically mounted on the first slide member and is configured to slide over the first slide member. A release means for manually removing the object from the first slide member is provided. The release means has a first shaft with a first and a second end. The first end of the first shaft holds one end of the object. The second end of the first shaft is connected to the second slide member. On pressing the second end of the first shaft, the end of the object is released and can be manually removed from the first slide member. An adjustable means for releasably locking the second slide member along the length of the first slide member is provided. The adjustable means has a second shaft with two ends. A first end of the second shaft is embedded in at least one of the plurality of channels of the elongated member through the support tube. The second end of the second shaft is connected to the second slide member. When the second end of the second shaft is pressed, the first end of the second shaft is disengaged from the elongated member, thereby allowing the second slide member to slide over the first slide member and to releasably lock along the length of the first slide member.

An alternate embodiment involves an optional additional feature of the locking mechanism comprising use of a locking pin having two pivot points (one on each end of the locking pin or locking mechanism) and the entire mechanism wraps about half way around the tubular pole under or near the hand guard grip or slide member. The pin fits securely under the release knob of the assembly. The alternate embodiment involves use of the original lock mechanism and the additional pin feature for added safety so that when used with a snare tool, the cable employed to ensure an object remains locked in placed, and one end of the cable does not accidently release. The inventive system overall can be employed with or without the additional safety lock mechanism.

A snaring apparatus employing the lock mechanism or tool for holding and guiding items such as industrial pipes in oil and gas industry is also disclosed in the present invention. The snaring apparatus includes a tubular pole having a first and a second end. A profiled head is mounted on the first end of the tubular pole while an endcap or handgrip is positioned at the second end of the tubular pole. A cable tube with a first and a second end forms a closed engageable loop. The first end of the cable tube is attached to the profiled head while the second end of the tube extends through the tubular pole. An elongated member is positioned inside the tubular pole. The elongated member consists of plurality of channels. A support tube is mounted on the elongated member and positioned inside the tubular pole. A handle is telescopically mounted on the tubular pole and is configured to slide over the tubular pole. A release means for manually removing the tube from the tubular pole is provided. The release means has a first lever with a first and a second end. The first end of the first lever holds the second end of the tube. The second end of the first lever is connected to the handle. On pressing the second end of the first lever, the second end of the tube is released and can be manually removed from the tubular pole. An adjustable means for varying the length of the loop of the tube is provided. This action also lengthens or shortens the cable tube. The adjustable means has a second lever with two ends. A first end of the lever is embedded in at least one of the plurality of channels of the elongated member through the support tube. The second end of the second lever is connected to the handle. When the second end of the second lever is pressed, the first end of the second lever is disengaged from the elongated member. This allows the handle to slide over the tubular pole and thereby to adjust the size of the closed engageable loop of the tube.

The alternate embodiment engages a locking pin behind the knob 132 to enable a more secure locking system. This lock does not enable sliding of the apparatus via knob 132, but prevents release of the cable tube via knob 132.

No springs are utilized in the present invention. It is a pressure loaded assembly. In an embodiment, the inventive snaring apparatus comprises the inventive slide lock assembly with or without the additional safety lock mechanism involving the pin with dual pivot points.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which:

FIG. 3A is a perspective view of a shaft of the release means of the slide lock assembly;

FIG. 3B is a perspective view of a shaft of the adjustable means of the slide lock assembly;

FIG. 15 illustrates an alternate view of the locking pin mechanism in the unlocked position;

FIG. 16 is the locking pin mechanism of FIG. 15 wherein the mechanism is in the locked position.

The sliding lock mechanism disclosed herein can be independently used in a multitude of applications involving telescoping and non-telescoping type structures. The invention will be discussed for simplicity relative to use in a telescoping application.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the slide lock assembly of the present invention utilizes a combination of system components. In addition, it should be observed that the snaring tool of the present invention utilizes a combination of system components which are suitable for gripping and or maneuvering industrial pipes and other objects. Other applications for the tool will be described while those of skill in the art may envision still alternate embodiments or applications.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Slide Lock Assembly

Figure 1:
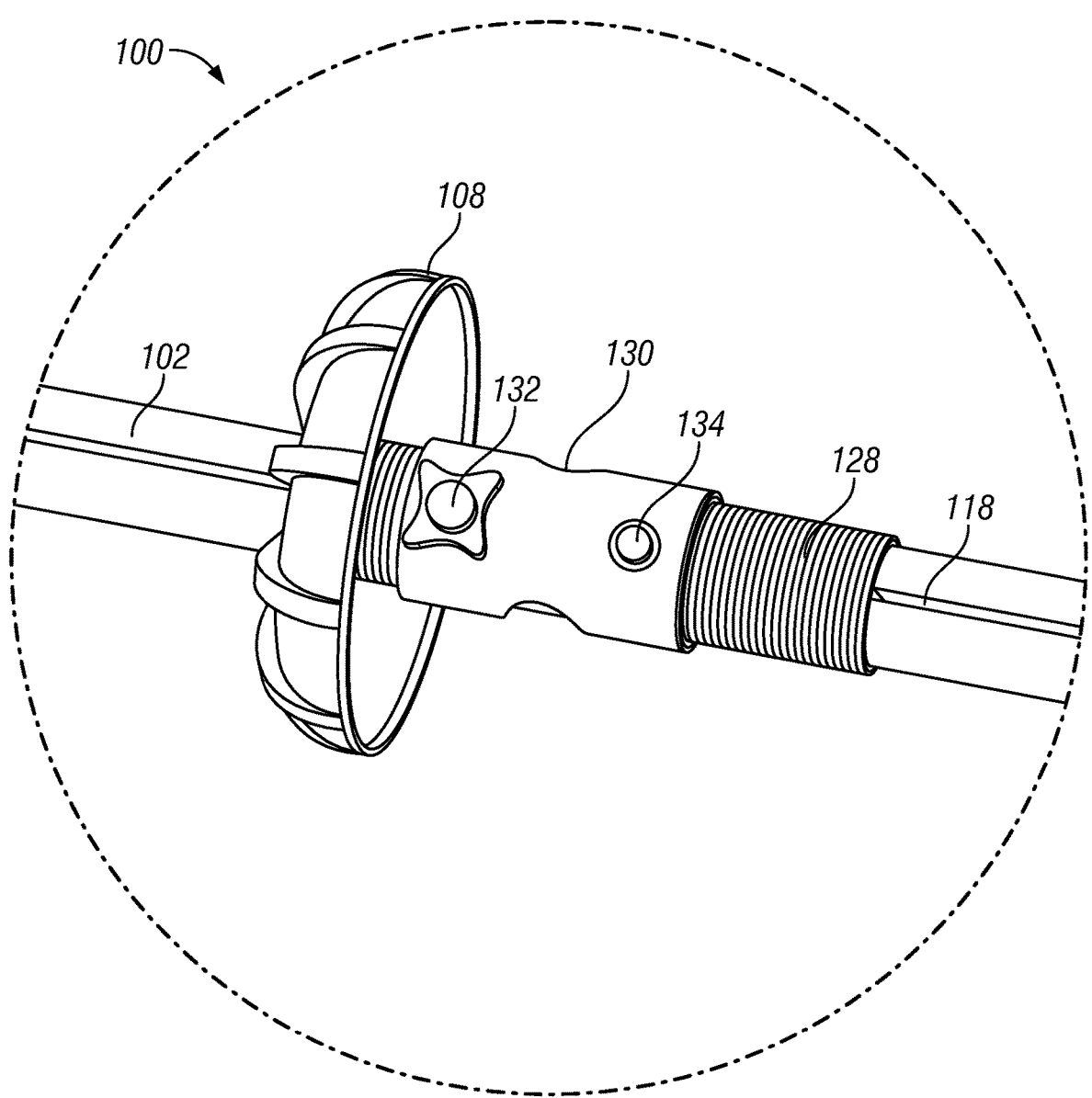
FIG. 1 is a perspective of the inventive slide lock assembly.

FIG. 1 illustrates a slide lock assembly 100 that includes a first slide member 102 and a second slide member 108. The second slide member 108 is telescopically mounted onto the first slide member 102. The second slide member 108 can slide relative to the first slide member 102. In an embodiment, the first slide member 102 is a tubular pole having a cylindrical sleeve that has a slot 118 extending axially along the length of the first slide member 102. In one embodiment, the first slide member 102 is a fiber glass pipe overlaid with graphite, referred to as a carbon shaft. While described as a carbon shaft, any tube is suitable provided the slide member 102 can slide within member 108. In another embodiment, the first slide member 102 is made of materials such as, but not limited to, aluminum, plastic, and the like. In some embodiments, the second slide member 108 is a handle or handgrip.

Figure 2A:
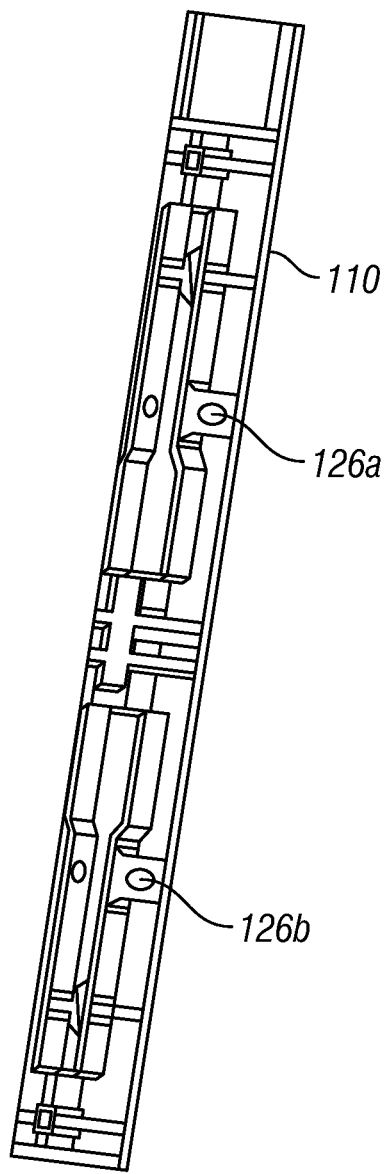
FIG. 2A is a perspective top view of an elongated member of the slide lock assembly.
Figure 2B:
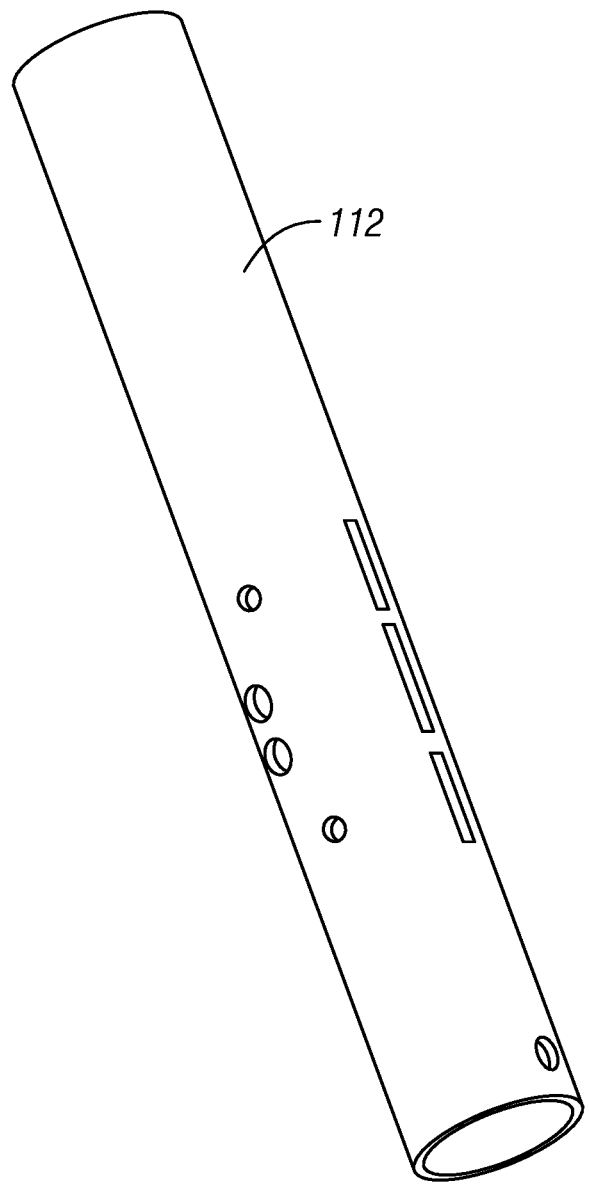
FIG. 2B is a perspective view of a support tube of the slide lock assembly.

As shown in FIGS. 2A and 2B, the slide lock assembly 100 includes an elongated member 110 and a support tube 112. The first slide member 102 houses both the elongated member 110 and the support tube 112. As shown in FIG. 2A, the elongated member 110 has a plurality of channels 126a-126b that are formed on its surface. In an embodiment, the elongated member 110 is made of nylon. Alternate materials may be employed provided they are sufficiently supportive for the lock assembly to remain in place, such as ABS, metallic materials which can be molded or formed as needed herein. As shown in FIG. 2B, the support tube 112 is a cylindrical sleeve that has a plurality of apertures and a plurality of slits. In an embodiment, the support tube 112 is made of fiber glass, but alternate materials include plastics such as ABS, nylon, or metallic materials such as aluminum, steel, galvanized steel, carbon steel and the like. The elongated member 110 is disposed inside the support tube 112 such that the support tube 112 encloses the elongated member 110. The support tube 112 along with the elongated member 110 is affixed inside the hollow interior of the first slide member 102.

As shown in FIG. 1, a clamp body 130 is affixed on the second slide member 108. A release button 132, or rotatable knob, and an adjust button 134 are installed on top of the clamp body 130. The release button 132 can be any shape, but is described herein as being square-shaped, and is twisted to move from a lock position to an unlock position. The adjust button 134 can also be of any shape and is described herein as a circular push button with a tubular body.

The slide lock assembly 100 includes a release means for engaging and disengaging an object, such as a cable, which can be held by the slide lock assembly 100. The slide lock assembly 100 further includes an adjusting means that is provided for releasably locking the second slide member 108 to the first slide member 102 along the length of the first slide member 102. The elongated member 110, the support tube 112, the release means, and the adjusting means form a central lock system for the slide lock assembly 100.

FIG. 3A illustrates the release or lock lever, and remains in position when the button 132 is released. This keeps the tube (also referred to as PU tube, or cable or cable tube) attached at one end. FIG. 3B illustrates the lever that works with 132 allowing the mechanism to slide up and down the tubing. FIGS. 3A and 3B are inserted into FIGS. 2A and 2B, wherein item 138a is used to secure one end of the cable within the slide mechanism. There is an indentation or depression, at the end of the cable, shown in FIG. 7A, where item 138a connects and acts to secure the cable. It is recommended that a metal ring be inserted inside the depression so as to hold the shape and help secure the cable to 138a. Studies have shown that up to 600 pounds of pull force applied did not break the connection of the cable to the slide mechanism. As shown in FIG. 3A, the release means includes a first shaft 136, having a first end 138a and a second end 138b. The first shaft 136 is pivotally mounted at a position between the first end 138a and the second end 138b on a first pin to form a lever. One end of the object is secured to the first end 138a of the first shaft 136. The first end 138a of the first shaft 136 has a hook-like structure that, when in use with for example a snare tool, secures a cable, rope, or tube which is looped around the object or load being held. The second end 138b of the first shaft 136 is in contact with the release button 132. The slot 118 of the first slide member 102 allows the first shaft 136 to be in contact with both the release button 132 and the secured article. The release means operates based on a lock and lever mechanism.

Figure 5:
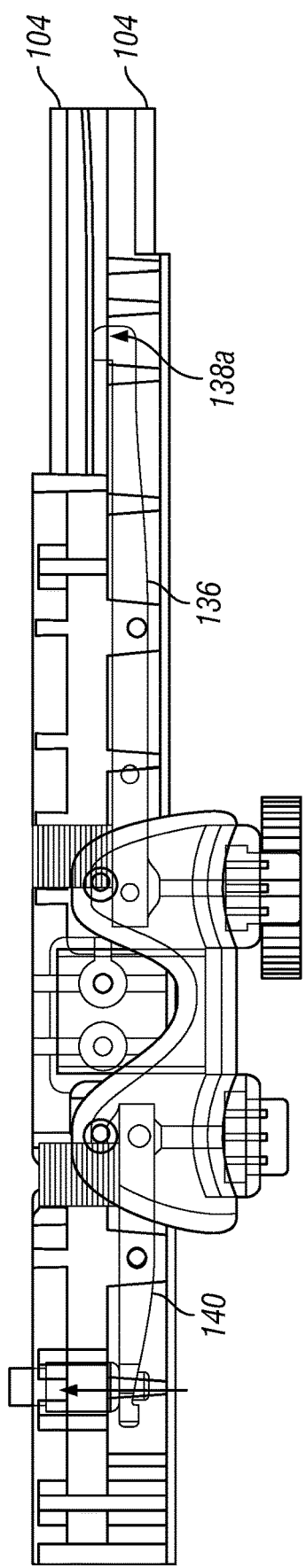
FIG. 5 is an illustration of the release means and adjustable means each in a neutral, non-actuated position.
Figure 6:
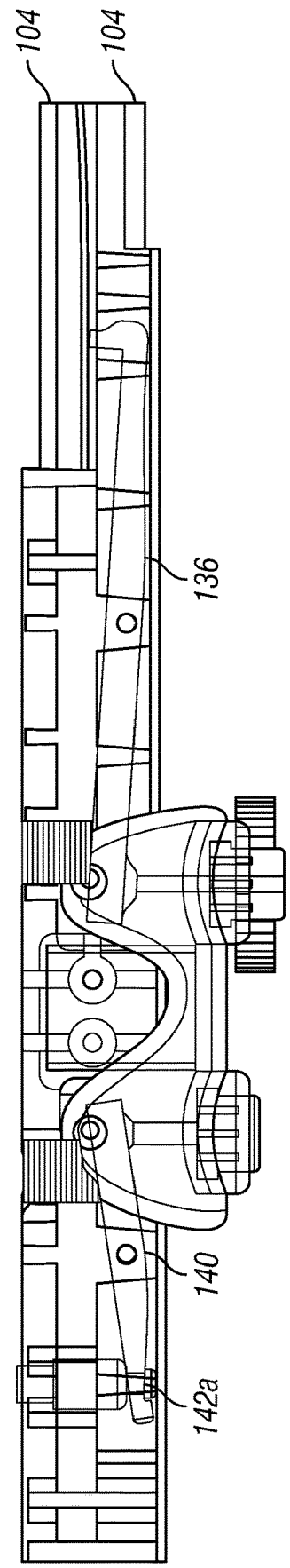
FIG. 6 is an illustration of the release means and the adjustable means each in an actuated position.

Initially, the release button 132 remains in the lock position, as illustrated in FIG. 5. In the lock position, the first end 138a of the first shaft 136 is constantly forced down on the end of an object or securing article, such as a hook. When the release button 132 is twisted from the lock position to the unlock position the first end 138a of the first shaft 136 is forced upwards to allow the object to be manually pulled out of place, as illustrated in FIG. 6. This arrangement is counterintuitive to traditional lock systems. In the present invention, the release button 132 is kept in the lock position and the lock and lever mechanism is used to unlock the hook around the object. The hook can be placed back to its initial position without twisting or pushing the release button 132.

The hook can slide under the first shaft 136 and connect to the first shaft 136, thereby allowing the hook to lock to the first shaft 136. Once the hook is secured on to the first shaft 136, the release button 132 is twisted from the unlock position to the lock position, thereby securing the hook to the shaft 136. In an embodiment, the release button 132 controls the lever and lock mechanism to disengage the object, which allows the user to manually pull the object out of place. It can be seen that the inventive release means operates based on non-spring-loaded mechanism to release the hook and object held from the slide lock assembly 100.

A latch system is configured to releasably lock the second slide member 108 to the first slide member 102. As shown in FIG. 3B, the latch system comprises an adjustable means that includes a second shaft 140 having a first end 142a and a second end 142b. The second shaft 140 is pivotally mounted between the first end 142a and the second end 142b on a pin. The first end 142a of the second shaft 140 has a cylindrical like body structure. The second end 142b of the second shaft 140 is in contact with the adjust button 134. In an initial state, the first end 142a of the second shaft 140 is embedded in a channel of the plurality of channels 126a-126b of the elongated member 110. The support tube 112 has a slit (not shown) that allows the second shaft 140 to be in contact with the elongated member 110. Further, the slot 118 of the first slide member 102 allows the second shaft 140 to be in contact with both the adjust button 134 and the elongated member 110. The slot 118 also supports screws or a system to secure one end of a cable to the slide member 102. See FIG. 7, items 118a, 118b, 118c. Shown are 3 screws for securing a cable, however, any type of security system may be employed, provided the cable is secured to the slide member 102. When the second shaft 140 is embedded in one of the plurality of channels 126a-126b, the second slide member 108 is non-movable. As the second shaft 140 is connected to the adjust button 134 of the second slide member 108, the second slide member 108 and the second shaft 140 move as single unit inside the hollow interior of the first slide member 102.

Figure 4:
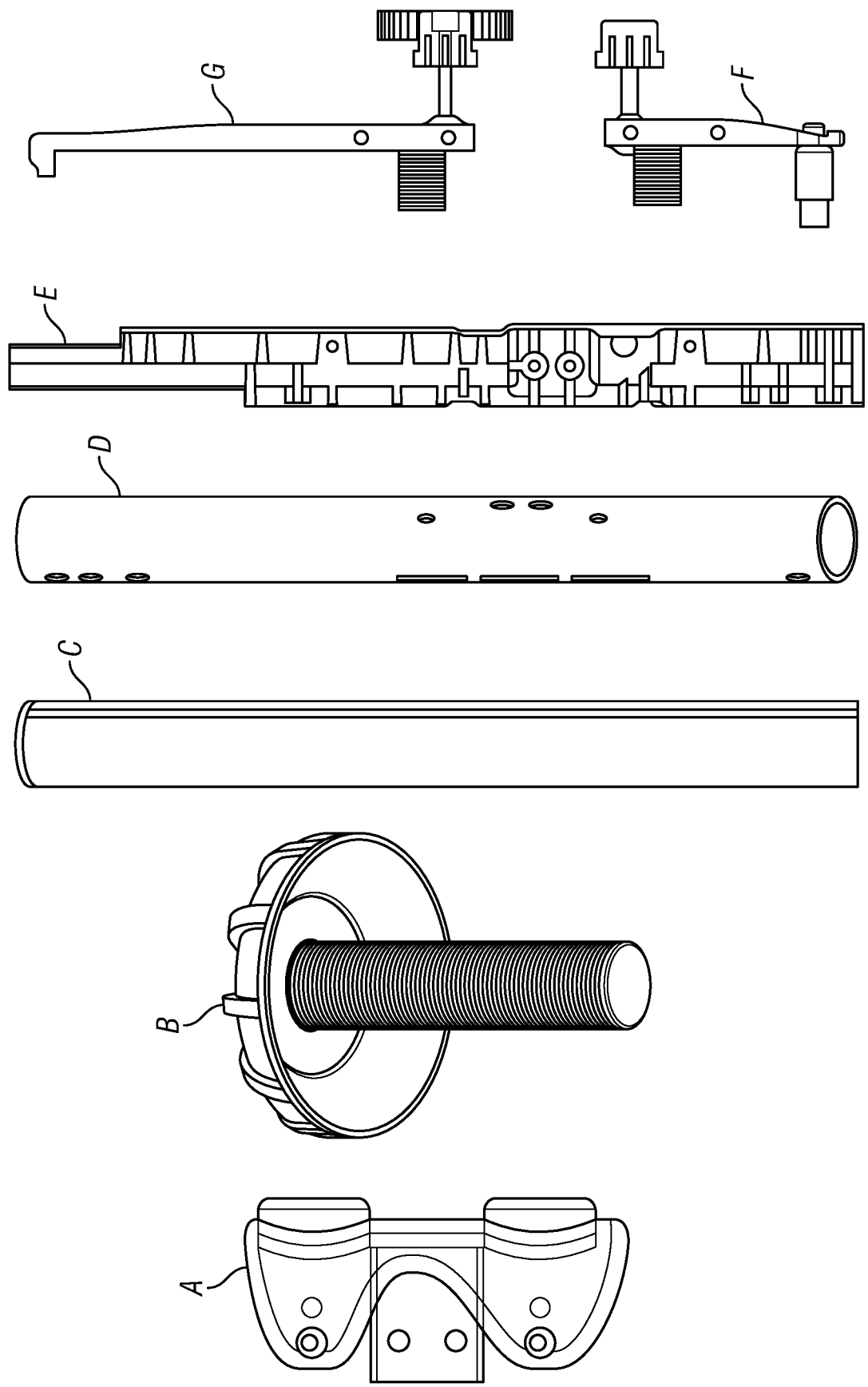
FIG. 4 A-G are an exploded view of the elongated member with clamp body, release means, and adjustable means of the slide lock assembly.

FIG. 4(A-G) is an exploded view illustrating various elements of the latch system, from the internal lever to the left of the Figure ranging to the external lever to the right of the FIG. 4. FIG. 4A illustrates the latch which attaches to the grip or guard handle 4B, followed by the slide portion 4C used in conjunction with items 4A and 4B, there above; FIG. 4D is the slide portion which slides into the housing on the retaining or tubular pole; FIG. 4E is a side view of FIG. 2A. FIG. 4G illustrates FIG. 3A with a knob attached, while FIG. 4F illustrates FIG. 3B with its knob attached.

FIG. 5 illustrates a cross section of the lock mechanism pieced together while FIG. 6 illustrates FIG. 5 having both buttons depressed allowing release of the slide mechanism. Here item 132 is considered the top button and item 134 the bottom button. When button 132 is pushed to release the end of the PU tube, the dual release feature of the snaring tool system is activated. When the adjust button 134 is depressed, as illustrated in FIG. 6, the first end 142a of the second shaft 140 is pivoted outwardly from the channel of the plurality of channels 126a-126b of the elongated member 110, thereby allowing the user to manually slide the second slide member 108 along the length of the first slide member 102. The release button 132 remains in the lock position when the adjust button 134 is not pressed, as shown in FIG. 5. As the release button 132 remains in the lock position, item 136 moves along with the second slide member 108.

Once the adjust button 134 is released, the first end 142a of the second shaft 140 embeds into a channel of the plurality of channels 126a-126b of the elongated member 110, thereby locking the second slide member 108 in its current position. The second slide member 108 does not move unless the adjust button 134 is pressed again. The user manually pushes down the adjust button 134 so that the second slide member 108 can slide up or down, thereby releasably locking the second slide member 108 along the length of the first slide member 102. The release means and the adjustable means are rigidly secured to the slide member 108 and slide along over the first slide member 102.

Figure 7:
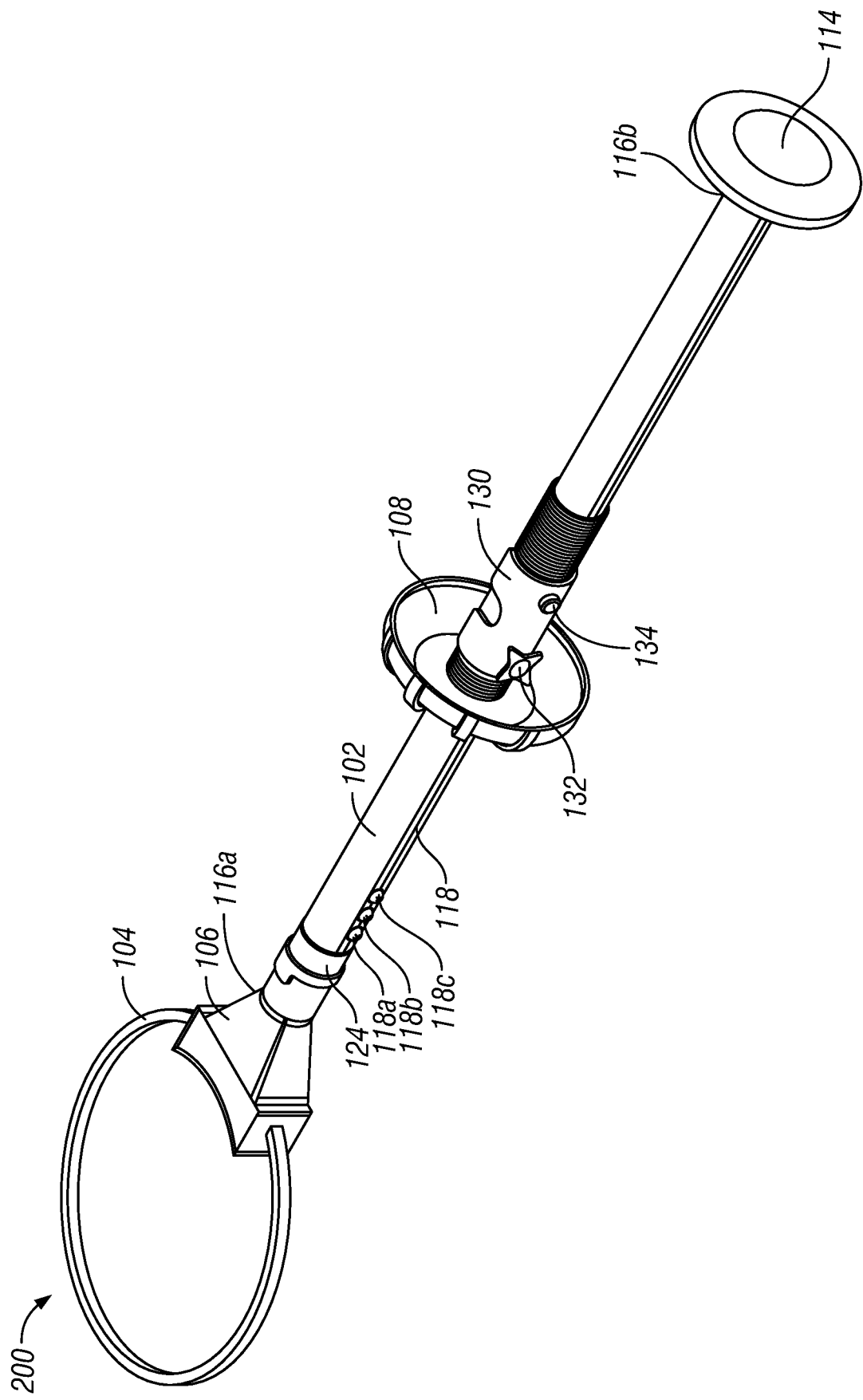
FIG. 7 is a perspective view of a snaring tool, according to an illustrative embodiment of the disclosure.

FIG. 7 shows the complete assembled tool. This figure does not show the optional additional locking pin mechanism. The pin lock mechanism can be optionally employed in this system, and serves as an additional safety feature of the tool.

The slide lock assembly 100 described has numerous applications. It may be used in a snaring tool for animals, for use during fishing trips to remove items (including various sizes fish and debris found in the water) in the water, for use by rescue personnel to secure or assist an individual, and the like. The slide lock assembly 100 in snaring tools can lock and vary the length of the cable used in a snaring tube and be designed to ensnare any size item. The snaring tool and the inventive lock mechanism can be used for retrieving and moving objects such as industrial pipes, people, and animals.

Alternate Lock Assembly (FIGS. 9-16)

Figure 8B:
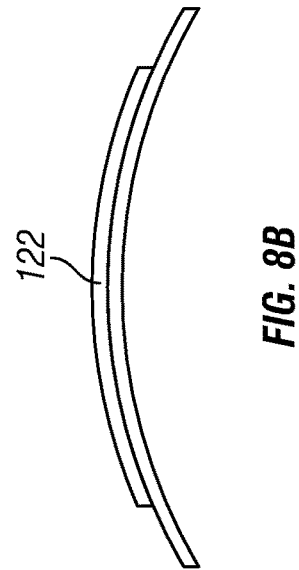
FIGS. 8A and 8B are perspective views of a bearing assembly and a silicon protector of a profiled head of the snaring tool.
Figure 8C:
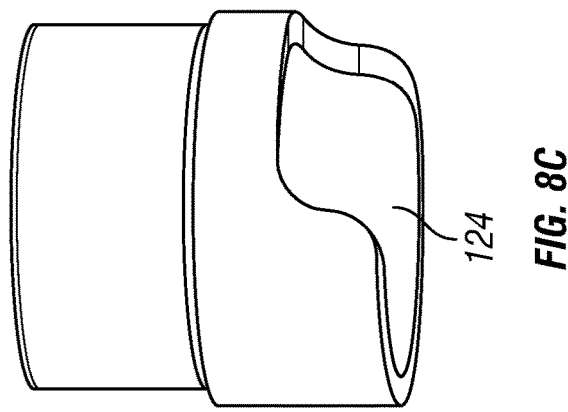
FIG. 8C is a perspective view of a head support or locking ring of the snaring tool.
Figure 8A:
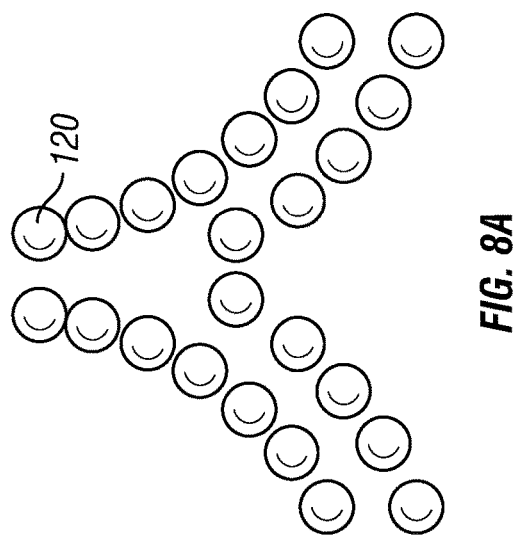
Figure 9:
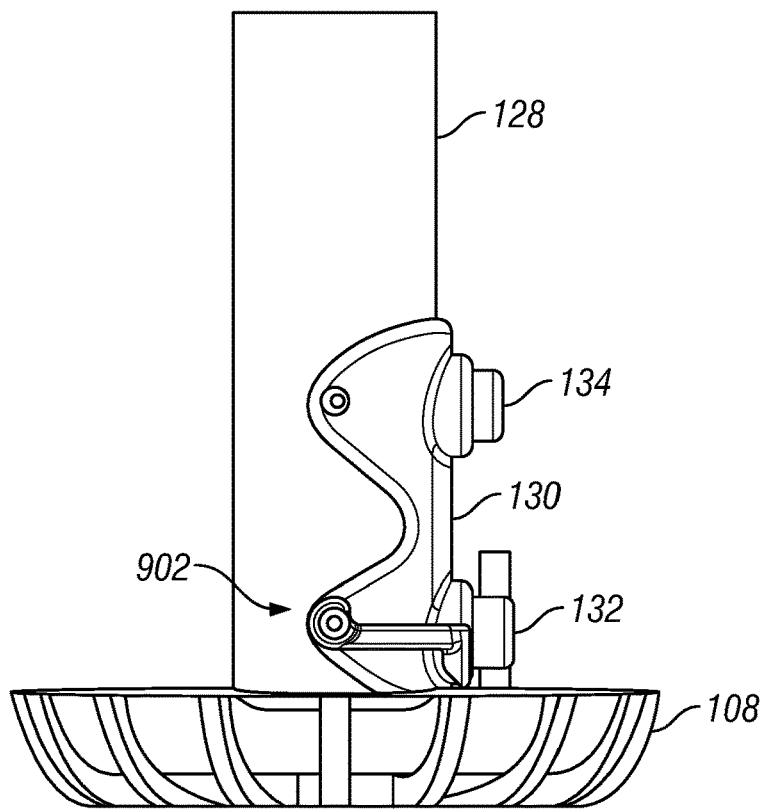
FIG. 9 is an illustration of the sliding hand grip with the additional safety lock mechanism shown.

An alternate, optional embodiment is shown in FIGS. 9-16 (also termed the locking pin mechanism). This is a different embodiment of item 108. The sliding hand guard or grip on the snare tool was modified to accept the locking pin mechanism and prevent accidental release of a cable on a snare tool. The alternate release or lock mechanism is in addition to the elongated member lock system of FIGS. 1-8. FIG. 9 shows the pin in the lock position and must be disengaged to push 132 and activate the lever on FIG. 3A and release the PU tubing. FIGS. 13-16 are different views of the locking pin. The locking pin mechanism comprises use of a locking pin having two pivot points (one on each end) and the entire mechanism wraps about half way around the tubular pole under or near the hand guard handle or slide member. The lock allows release of the cable inside the tubular pole to be lengthened or shortened as needed by pressing or depressing knob 132. Here, depressing 132 opens the loop and depressing 134 allows you to slide the mechanism lengthening or shortening the loop as needed.

FIG. 9 is a side view illustration of the sliding hand grip with the alternate lock mechanism. Seen is the locking pin or arm 902. This view illustrates half the lock pin, while the other half is on the other side of the hand grip. Item 902 attaches to item 130 and slips behind 132 to lock behind or below the grip 108, and keep from being depressed. Also shown in FIG. 9 is post 128, bottom button 134, and top button 132. 132 controls the lever of 138a; 902 prevents the accidental engagement of knob 132.

Figure 10:
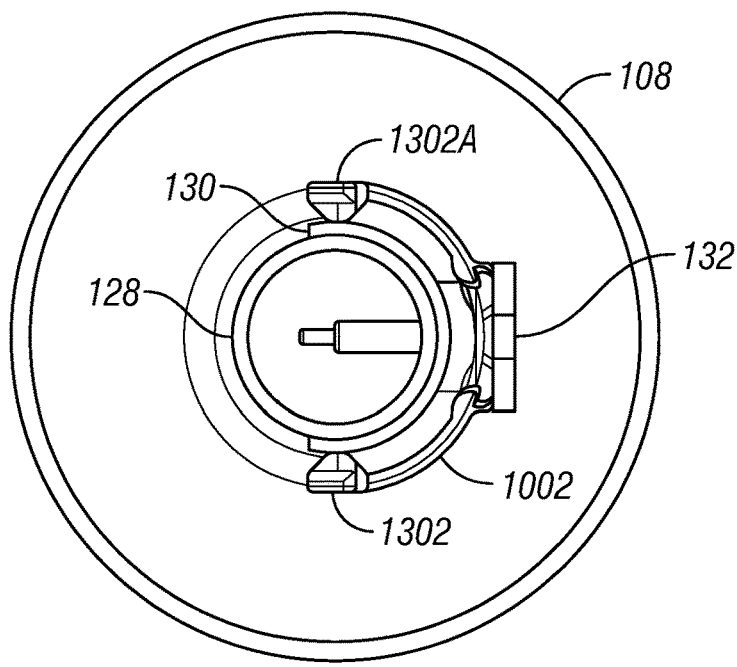
FIG. 10 is a cross sectional view of the additional lock mechanism showing the lock wrapping halfway around the tuber.

FIG. 10 is a cross sectional view of the locking pin mechanism showing the lock wrapping halfway around the tube. This lock is used to release the PU tube (shown as item 104 in FIG. 7). The size of the lock mechanism can vary based on the length and width of the tubing used, and can be adapted or varied in shape to fit the cable tubing employing. The bottom button allows the cable loop 104 to lengthen or shorten. The top button allows the user to release one end of 104. Here in FIG. 10 is seen items 138, 130, knob 132, and the locking mechanism. Also shown is a side view of both pivot points in the locked position, labeled here as 1302 (seen on top and bottom portion of FIG. 10).

Figure 11:
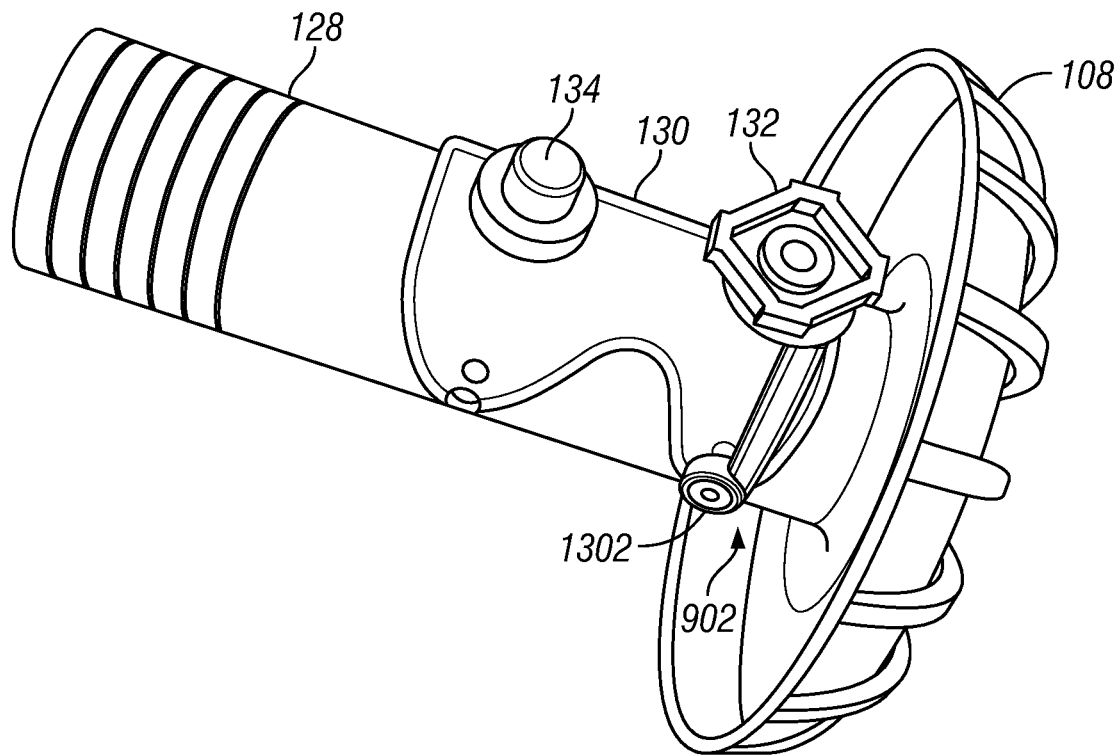
FIG. 11 illustrates the locking grip mechanism in a locked position.
Figure 12:
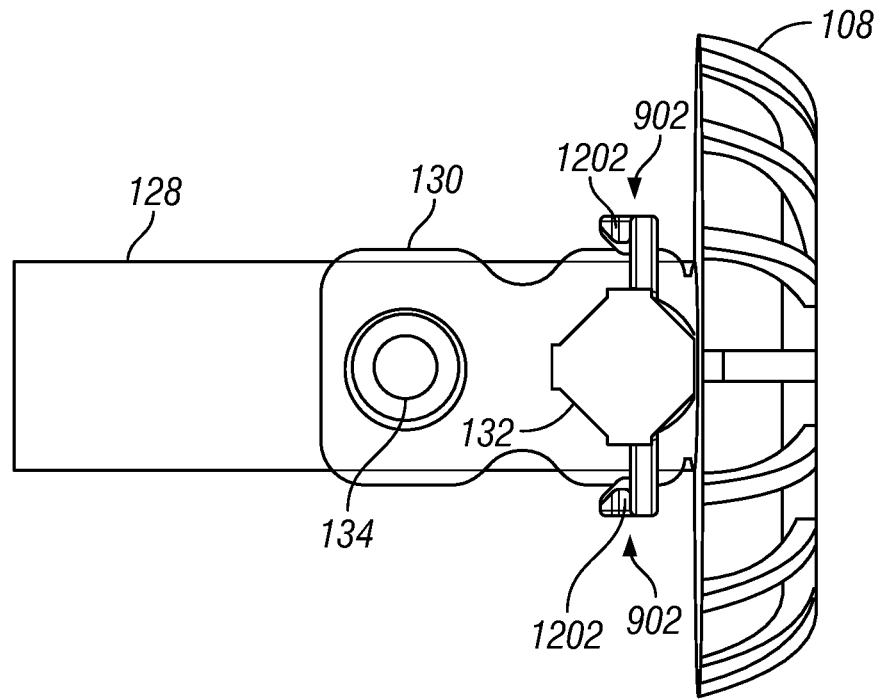
FIG. 12 illustrates an alternate view of FIG. 11 showing the additional lock pin mechanism.

FIGS. 11 and 12 illustrate the lock position for the alternate locking pin. FIG. 11 illustrates the grip mechanism in a locked position. Shown is item 128, knobs 132 and 134, and locking mechanism 902 (showing half the lock mechanism). This position shown prevents a user from pushing on knob 132 to release one end of the PU tubing 104.

FIG. 12 does not show the pivot points since these are behind the arm or handguard/grip mechanism. Item 902 is shown with end 1202. End 1202 is a design feature to allow pivot and locking of the pin with the latch.

Figure 13:
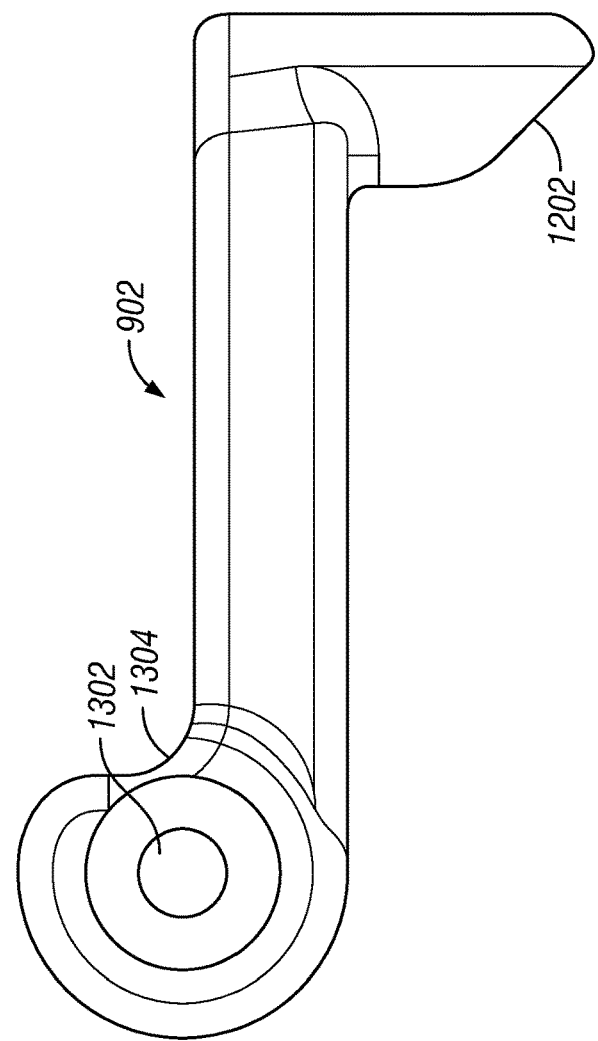
FIG. 13 illustrates a side view of the optional lock pin mechanism.

FIG. 13 illustrates a side view of 902, and in particular item 1202, and the curvature of the locking pin 1304. This curve is shown here as a curve so as to match the tubing. This is strictly for illustrative purposes as the design could be anything provided it matches the knob and notch assembly to hold the lock in place. The shape is provided to allow the mechanism to get underneath the knobs 13. This pin matches with and pivots from item 136.

Figure 14:
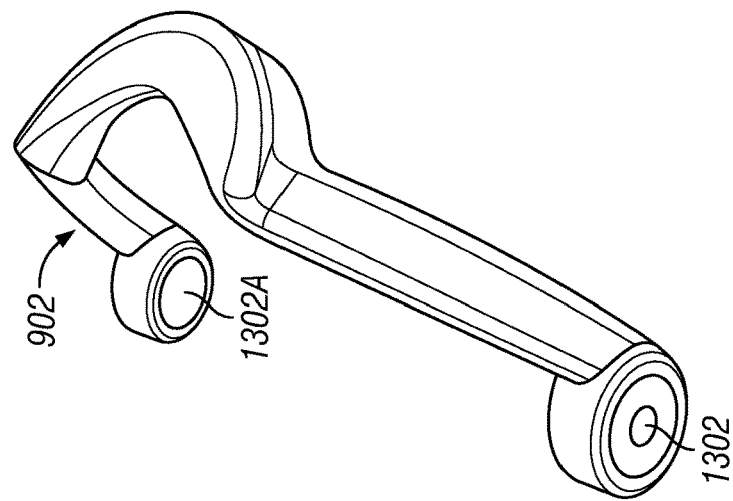
FIG. 14 illustrates an alternate view of FIG. 13, wherein both pivot points are shown.

FIG. 14 illustrates an alternate view of FIG. 13 (item 902), wherein both pivot points are shown.

FIGS. 15 and 16 illustrate the unlocked and locked position of 902, respectively. FIG. 15 in particular, the unlocked position, and shows items 1202 and 1304. 1304 wraps around the stem. 1304 can vary in shape as desired by user, provided it matches the tubing employed which houses any desired cable; the cable can be round, cube, partially round/cubed or squared.

FIG. 16 is the locking mechanism of FIG. 15 wherein the mechanism is in the locked position.

Snaring Tool

FIG. 7 illustrates a snaring tool 200 that is used for holding or gripping industrial pipes in the oil and gas industry. The snaring tool 200 includes (as a first slide member) a tubular pole 102, a tube 104, a profiled head 106, a handle 108, an elongated member 110 (FIG. 2A), a support tube 112 (FIG. 2B), and an endcap 114. The tubular pole 102 has a first end 116a and a second end 116b, as shown in FIG. 7. The tubular pole 102 is a cylindrical sleeve that has a slot 118 extending axially along the length of the tubular pole 102. In one embodiment, the tubular pole 102 is a fiber glass pipe overlaid with graphite, referred to as a carbon shaft. In another embodiment, the tubular pole 102 is made of materials such as, but not limited to, aluminum, plastic, and the like.

Figure 7A:
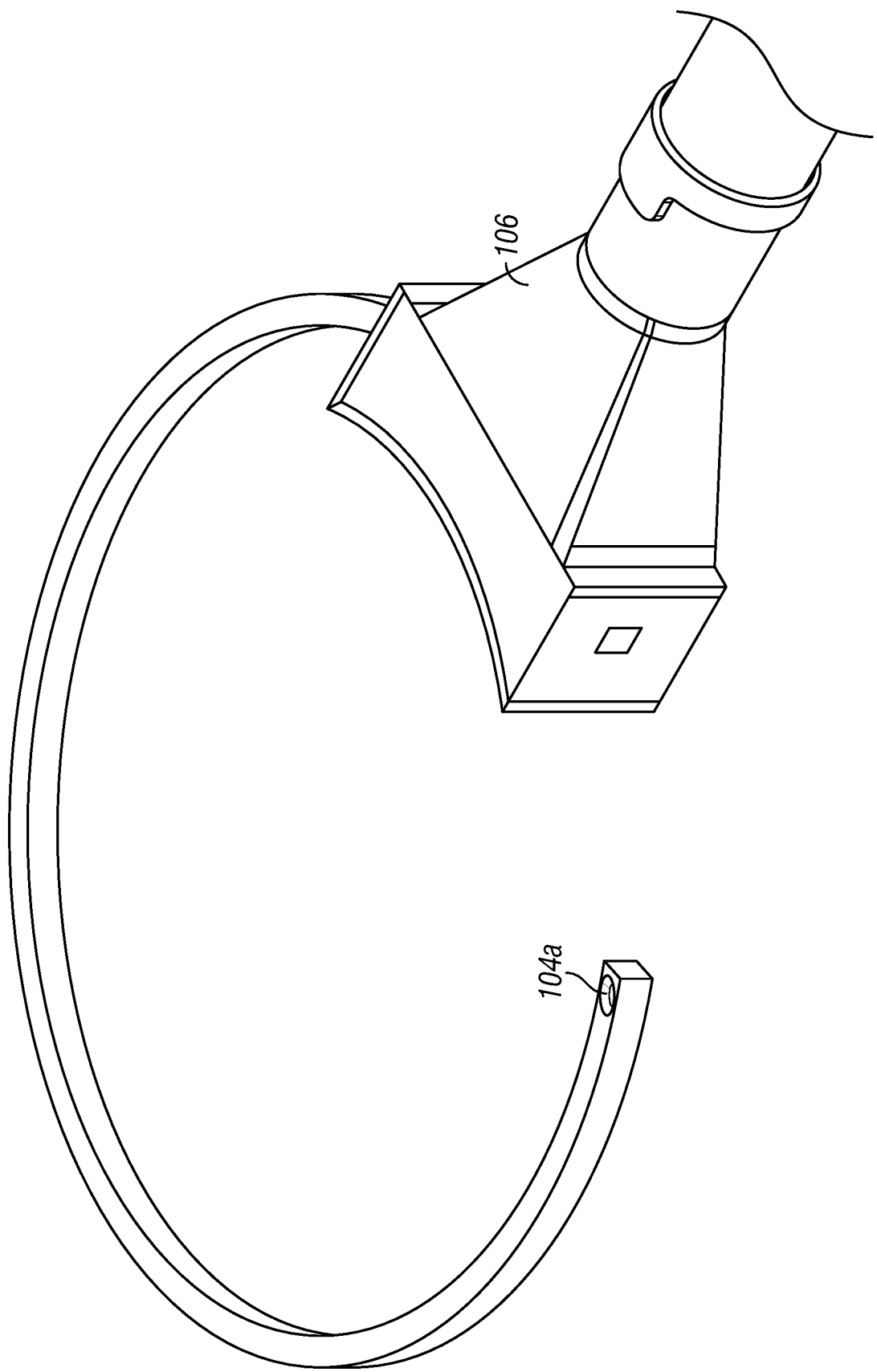
FIG. 7A is an illustration of the cable tubing of the snaring tool disengaged from the tool.

The tube 104 is a flexible wire, rope, tubing, cable, or strap with a first end and a second end (not shown). The first and second ends of the tube 104 are referred to as free ends. In one embodiment, the tube 104 is a half round, half flat shaped polyurethane ("PU") tube. Tube 104 is secured at one end to the base of support tube 112 via profiled head 106 and the other end by the first end 138a of the first shaft 136, before handle 108. The profiled head 106 is mounted to the first end 116a of the tubular pole 102. The first end of the tube 104 is secured to the profiled head 106. The second end of the tube 104 extends into a hollow interior of the tubular pole 102 through the profiled head 106 to form a loop. The profiled head 106 is molded to a shape that allows the formation of the loop of the tube 104. In one embodiment, the profiled head 106 is of oval shape but other shapes are envisioned and can be any as desired by the user, and within the scope of the PU tubing. The profiled head 106 supports the tube 104. FIG. 8A illustrates the roller ball bearings held inside the head; FIG. 8B illustrates the silicon protector and FIG. 8C illustrates the head support for the tool. As shown in FIG. 8A, strands of the loop of the tube 104 are held by a ball bearing assembly 120 positioned in the profiled head 106 to retain the shape of the loop of the tube 104. As shown in FIG. 8B, the profiled head 106 further includes a silicon protector 122 to prevent the tube 104 from being damaged. As shown in FIGS. 7 and 8C, the profiled head 106 is secured to the tubular pole 102 by means of a head support 124. As shown in FIG. 7, the head support 124 mounts the profiled head 106 to the first end 116a of the tubular pole 102. Further, the shape of the loop of the tube 104 is held by the profiled head 106 that is secured by the ball bearing assembly 120, the silicon protector 122, and the head support 124. FIG. 7A illustrates the cable 104 disengaged from the head 106.

The cable 104 is secured onto the sliding member 102 on one end. This fixes the cable to the sliding member, and the end moves with the sliding member. The other end of the cable is able to be removed from the snare assembly, as seen in FIG. 7A. The removable end is secured to the snare assembly via an indentation on the cable end, which is secured to 138a of shaft 136. This method of placement for the cable 104 allows for the enlargement or shortening of the cable loop as desired by the user, by merely sliding the member 102 up or down. The loop can then be manually disengaged from 106. After removal of the object, the cable can be replaced back into the assembly by manually inserting into the side of 106 from which it was removed, and re-engaged with shaft 136, item 138a. In the present design embodied, both ends of the cable or PU tube are tightened and released via the sliding member 102. Since both ends of the tube or cable are secured on the sliding member, as the member slides, both sides of the resulting cable loop move equally to enlarge or shorten the loop formed. Both sides are pulled into or out of the tube 102 by sliding the member up and down. By pulling on both sides of the cable ends, the load around an object is aligned or centered on the tube, and there is no excess cabling at the end of the support member 102.

As shown in FIG. 2A, the elongated member 110 has a plurality of channels 126a-126b that are formed on its surface. In an embodiment, the elongated member 110 is made of molded nylon but other materials may be used such as metal or metallic based members. As shown in FIG. 2B, the support tube 112 is a cylindrical sleeve that has a plurality of apertures and a plurality of slits. In an embodiment, the support tube 112 is made of fiber glass. The elongated member 110 is disposed inside the support tube 112 such that the support tube 112 encloses the elongated member 110. The support tube 112 along with the elongated member 110 is affixed inside the hollow interior of the tubular pole 102. The support tube may be made of other materials such as hard plastics such as ABS, nylon based materials, or metals such as stainless steel or aluminum.

As shown in FIG. 1, the handle 108 is telescopically mounted onto the tubular pole 102. The handle 108 can slide relative to the tubular pole 102. In an embodiment, the handle 108 may have a handle grip 128 that allows a user to grip the snaring tool 200 with ease. A clamp body 130 is affixed on the handle 108. A release button 132 and an adjust button 134 are installed on top of the clamp body 130. The release button 132 is roughly square-shaped and is twisted to move from a lock position to an unlock position. The adjust button 134 is a circular push button with a tubular body. The shape of these buttons 132 and 134 can be altered as desired by the user and not depart from the scope of the invention.

The snaring tool 200 includes a release means for disengaging the tube 104 to release the loop formed by the tube 104. The snaring tool 200 further includes an adjusting means that is provided for varying the size of the loop formed by the tube 104. The elongated member 110, the support tube 112, the release means, and adjusting means form a central lock system for the snaring tool 200.

As shown in FIG. 3A, the release means includes a first shaft 136 having a first end 138a and a second end 138b. The first shaft 136 is pivotally mounted at a position between the first end 138a and the second end 138b on a first pin to form a lever. The second end of the tube 104 is secured to the first end 138a of the first shaft 136. The first end 138a of the first shaft 136 has a hook-like structure that is latched on to a hole formed at the second end of the tube 104. The second end 138b of the first shaft 136 is in contact with the release button 132. The slot 118 of the tubular pole 102 allows the first shaft 136 to be in contact with both the release button 132 and the tube 104. The release means operates based on lock and lever mechanism. The release means allows a user to disengage the second end of the tube 104 from the snaring tool 200. No springs are utilized in this lock and lever mechanism.

Initially, the release button 132 remains in the lock position, as illustrated in FIG. 5. In the lock position, the first end 138a of the first shaft 136 is constantly forced down on the tube 104. When the release button 132 is twisted from the lock position to the unlock position, the first end 138a of the first shaft 136 is forced upwards to allow the tube 104 to be manually pulled out of place, as illustrated in FIG. 6. This arrangement is counterintuitive to traditional lock systems. In the present invention, the release button 132 is kept in the lock position and the lock and lever mechanism is used to unlock the tube 104. The tube 104 can be placed back to its initial position without twisting or pushing the release button 132. The hole or indentation of the tube 104 allows the tube 104 to slide under the first shaft 136 and catch on to the hook of the first shaft 136, thereby allowing the tube 104 to lock to the first shaft 136. Once the tube 104 is hooked on to the first shaft 136, the release button 132 is twisted from the unlock position to the lock position, thereby securing the tube 104 to the first shaft 136. In an embodiment, the release button 132 controls the lever and lock mechanism to disengage the tube 104, which allows the user to manually pull the tube 104 out of place, thereby freeing the formation of the loop of the tube 104. It can be seen that the present release means operates based on non-spring-loaded mechanism to release the tube 104 from the snaring tool 200.

As shown in FIG. 3B, the adjustable means includes a second shaft 140 having a first end 142a and a second end 142b. The second shaft 140 is pivotally mounted between the first end 142a and the second end 142b on a pin. The first end 142a of the second shaft 140 has a cylindrical body-like structure. The second end 142b of the second shaft 140 is in contact with the adjust button 134. In an initial state, the cylindrical structure of the first end 142a of the second shaft 140 is embedded in a channel of the plurality of channels 126a-126b of the elongated member 110. The support tube 112 has a slit (not shown) opposite the holes that allows the second shaft 140 to be in contact with the elongated member 110. Support tube 112 hence is slidably connected with member 110, to allow adjustment of the size of the loop. Further, the slot 118 of the tubular pole 102 allows the second shaft 140 to be in contact with both the adjust button 134 and the elongated member 110. When the second shaft 140 is embedded in one of the plurality of channels 126a-126b, the handle 108 is non-movable. As the second shaft 140 is connected to the adjust button 134 of the handle 108, the handle 108 and the second shaft 140 move as a single unit inside the hollow interior of the tubular pole 102.

FIG. 4 is an exploded view illustrating various elements of the adjustable means and the release means, ranging from the internal lever to the left of the Figure to the external lever to the right of the Figure. FIGS. 4A-4G are described above.

When the adjust button 134 is depressed, as illustrated in FIG. 6, the first end 142a of the second shaft 140 is pivoted outwardly from the channel of the plurality of channels 126a-126b of the elongated member 110, (i.e., toward the opposing internal wall surface of the elongated member) thereby allowing the user to manually slide the handle 108 along the length of the tubular pole 102. The release button 132 remains in the lock position when the adjust button 134 is not pressed, as shown in FIG. 5. As the release button 132 remains in the lock position, the tube 104 moves along with the handle 108, thereby varying the size of the loop. When the handle 108 is moved towards the end cap 114, the second end of the tube 104 is pulled towards the end cap 114, thereby reducing the size of the loop of the tube 104. The end cap 114 is positioned at the second end 116b of the tubular pole 102. The end cap 114 is provided to secure the handle 108, thereby allowing the handle 108 to slide within the length of the tubular pole 102.

Once the adjust button 134 is released, the first end 142a of the second shaft 140 embeds into a channel of the plurality of channels 126a-126b of the elongated member 110, thereby locking the handle 108 in its current position. The handle 108 does not move unless the adjust button 134 is pressed again. The user manually pushes down the adjust button 134 so that the handle 108 can slide up or down to control the size of the loop. As mentioned above, to increase the size of the loop, the adjust button 134 must be pressed and the handle 108 must be manually pushed towards the profiled head 106 of the tubular pole 102, and to decrease the size of the cable loop, the adjust button 134 must be pressed and the handle 108 must be manually pulled towards the end cap 114. The mechanism is bidirectional as it allows the user to either pull the handle 108 towards the end cap 114 to decrease the size of the loop or push the handle 108 towards the profiled head 106 of the tubular pole 102 to increase the size of the loop. It can be seen that the release means operates based on a non-spring-loaded mechanism to increase or decrease the size of the loop. The release means and the adjustable means are rigidly secured to the handle 108 and slide along with the handle 108 over the tubular pole 102. The release and the adjust buttons 132 and 134 control the release and size of the loop of the tube 104, respectively.

When the alternate, additional locking pin mechanism is employed with the tool, the cable is engaged and locked until the pin is manually pushed away from knob 132, and 132 is pressed and the cable is released, disengaging the tool from the load (i.e., load referring to whatever the cable or PU tube is strapped to or around). The purpose or objective of the tool is to easily snare an object and guide it to its landing or desired location. The ease here of lengthening and shortening the loop allows the user to quickly engage or disengage the load.

A principal advantage with the present invention is that the snaring tool 200 includes a half round, half flat PU tube 104 that allows more surface area and flexibility to grip industrial pipes and other items. The PU tube 104 provides better adhesion for industrial pipes, or other items, compared to a traditional cable. The PU tube 104 is sufficiently durable to withstand its use in the oil and gas industry compared to traditional cable. The snaring tool 200 is designed to prevent the user from manually touching the tube 104 to adjust its loop size. The lock and lever mechanism of the snaring tool 200 allows the user to retract the tube 104 to form a loop of desired size. The user adjusts loop size of the tube 104 by pushing the handle 108 towards the profiled head 106 of the tubular pole 102 to increase loop size or by pulling the handle 108 towards the end cap 114 to decrease the loop size Also, the non-spring-loaded mechanism included in the snaring tool 200 provides better safety as it prevents accidental release of the tube 104. The user must twist and depress the release button 132 to the unlock position and then manually pull the tube 104 out of place. Further, the tube 104 does not extend out at the user's side or beyond the pole 102. This allows the snaring tool 200 to be a greater safety device as it does not allow excess of the tube 104 to hit the user and/or other persons.

The snaring tool 200 described has numerous applications. It may be used for holding and moving industrial pipes having from about 5-6" to about 12-18" in diameter or larger. The tool can be designed to ensnare any size item even greater than 18" by modifying the tube length and tubing as desired by the user. As such, the uses are varied. It may be used by animal control workers to secure loose animals. The snaring tool 200 can be used for crowd control by having the loop go around the shoulder area of an individual. The snaring tool 200 may also be used for rescue purposes. For crowd control and rescue purposes, the tube 104 has to be sufficiently long so that the loop formed by the tube 104 can be of adequate size to hold people. The snaring tool 200 can be used for fishing to ensnare large fish in place of a net. In an embodiment, the snaring tool 200 may have an accessory, such as a tape measure, to determine size of the loop for object it holds. Hence, the snaring tool 200 can be used to measure size of fish with a tape measure affixed to the tube 104. In another embodiment, the snaring tool 200 may have a gaff hook that can be used to grab an object. The gaff hook can be pulled easily. The PU tube 104 can hold up to and greater than 350 lbs. In an embodiment, a heat sensitive material is coated on the PU tube 104 so that the snaring tool 200 can be used for high heat applications. Alternatively other types of cables can be used with the present device as desired by a user and their particular needs.

The present invention has been described herein with reference to a particular embodiment for a particular application. Although selected embodiments have been illustrated and described in detail, it may be understood that various substitutions and alterations are possible. Those having an ordinary skill in the art and access to the present teachings may recognize additional various substitutions and alterations are also possible without departing from the spirit and scope of the present invention.

What is claimed is:

1. A slide lock assembly comprising:
(a) a first slide member;
(b) an elongated member, comprising a plurality of channels positioned within the first slide member;
(c) a second slide member telescopically mounted on the first slide member and configured to slide over the first slide member;
(d) a release means having a first shaft, wherein a first end of the first shaft is adapted to secure an object and a second end of the first shaft is connected to the second slide member and;
(e) an adjustable latch system, configured to releasably lock the second slide member to the first slide member, comprising a second shaft having a first end adapted to seat within at least one of the plurality of channels of the elongated member and a second end connected to the second slide member.

2. The slide lock assembly of claim 1, further comprising a clamp body secured to the second slide member.

3. The slide lock assembly of claim 2, wherein the release means further comprises a rotatable release knob disposed within the clamp body such that when the rotatable release knob is in an unlocked position, pressure applied to the rotatable release knob transmits pressure to the second end of the first shaft, and wherein, when the first end of the first shaft is engaged securing an object, pressure applied to the second end of the first shaft causes the first end of the first shaft to release the object.

4. The slide lock assembly of claim 2, wherein the adjustable latch system further comprises an adjust button disposed within the clamp body such that when the adjust button is depressed, pressure is applied to the second end of the second shaft, and wherein, when the adjust button is depressed, the first end of the second shaft disengages from the plurality of channels of the elongated member, thereby releasing the second slide member to slide over the first slide member.

5. The slide lock assembly of claim 1, wherein the first slide member is a tubular pole.

6. The slide lock assembly of claim 1, further comprising a support tube that is mounted on the elongated member and positioned inside the first slide member.

7. The slide lock assembly of claim 1, wherein the first slide member has a slot running axially along the length of the first slide member configured to accommodate the second end of the first shaft and the second end of the second shaft.

8. The slide lock assembly of claim 1 configured to secure an object within the first slide member.

9. A snare, comprising:
(a) a tubular pole having a first end and a second end;
(b) a profiled head mounted on the first end of the tubular pole;
(c) a cable tube having a first end and a second end, wherein the first end of the cable tube is attached to the profiled head and the second end of the cable tube extends through the profiled head into the tubular pole so as to form a closed engageable loop;
(d) an elongated member comprising a plurality of channels positioned within the tubular pole;
(e) a handle telescopically mounted on the tubular pole and configured to slide over the tubular pole;
(f) a release means having a first shaft, wherein a first end of the first shaft secures to the second end of the tube within the tubular pole, wherein a second end of the first shaft is secured to the handle, and wherein, when the second end of the first shaft is pressed, the first end of the first shaft releases the second end of the cable tube, thereby allowing a user to remove the cable tube from the tubular pole; and
(g) an adjustable means having a second shaft, wherein a first end of the second shaft is embedded in the plurality of channels of the elongated member, wherein a second end of the second shaft is connected to the handle, and wherein, when the second end of the second shaft is pressed, the first end of the second shaft is disengaged from the elongated member, thereby allowing the handle to slide over the tubular pole to adjust the size of the closed engageable loop of the cable tube,
and having a slide lock assembly comprising:
(a) a first slide member;
(b) an elongated member, comprising a plurality of channels positioned within the first slide member;
(c) a second slide member telescopically mounted on the first slide member and configured to slide over the first slide member;

(d) a release means having a first shaft, wherein a first end of the first shaft is adapted to secure an object and a second end of the first shaft is connected to the second slide member and;

(e) an adjustable latch system, configured to releasably lock the second slide member to the first slide member, comprising a second shaft having a first end adapted to seat within at least one of the plurality of channels of the elongated member and a second end connected to the second slide member.

10. The snare of claim 9, further comprising a support tube that is mounted on the elongated member and positioned inside the tubular pole.

11. The snare of claim 9 wherein the tubular pole has a slot running axially along the length of the tubular pole configured to accommodate the second end of the first shaft and the second end of the second shaft.

12. The snare of claim 9 wherein one end of the cable tube is secured to the slot.

13. The snare of claim 12 wherein another end of the cable tube is secured to the handle that slides over the tubular pole and the slide lock is configured to secure an object within the first slide member.

14. The snare of claim 9, wherein the profiled head comprises a bearing assembly.

15. The snare of claim 9 wherein the profiled head comprises a silicon protector to prevent damage to the tube.

16. The snare of claim 9, further comprising a clamp body having a release button and an adjust button, positioned on the handle, and configured to transmit pressure applied to one or both of the release button and the adjust button inward to one or both of the second end of the first shaft and the second end of the second shaft, respectively and allowing lengthening or shortening of the cable tube.

17. The snare of claim 9 wherein a pin having pivots at each end is placed over the tubular pole and under the release means to prevent transmittal of pressure to the release button.

18. The snare of claim 17 wherein the pin is manually locked or unlocked under the release button.

19. A method of utilizing the snare of claim 9 to guide and manipulate objects.

20. The slide lock assembly of claim 3 wherein the clamp body further comprises a locking pin having two pivot points engaged with the adjustable latch system wherein upon pressure applied to the release knob the first end of the first shaft is released.

21. The slide lock assembly of claim 20, wherein the locking pin is engaged with the first end of the first shaft securing an object, and when pressure is applied to the second end of the first shaft, release of the cable tube occurs.

22. The snare of claim 16 wherein the cable tube lengthens or shortens when pressure is applied to the release or adjust buttons respectively, sliding the telescopic handle up or down the tubular post.

* * * * *